(12) United States Patent
Babol et al.

(10) Patent No.: US 10,268,466 B2
(45) Date of Patent: Apr. 23, 2019

(54) SOFTWARE INSTALLER WITH BUILT-IN HYPERVISOR

(71) Applicant: International Business Machines Corporation, Armonk, NY (US)

(72) Inventors: Adam Babol, Cracow (PL); Mariusz Kolodziej, Cracow (PL); Blazej Rutkowski, Cracow (PL); Marcin Smetek, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/096,382

(22) Filed: Dec. 4, 2013

(65) Prior Publication Data

US 2014/0173589 A1    Jun. 19, 2014

(30) Foreign Application Priority Data

Dec. 14, 2012 (GB) .................................... 1222633.8

(51) Int. Cl.
| | |
|---|---|
| *G06F 8/61* | (2018.01) |
| *G06F 9/455* | (2018.01) |
| *G06F 21/57* | (2013.01) |
| *G06F 9/445* | (2018.01) |

(52) U.S. Cl.
CPC ................ *G06F 8/61* (2013.01); *G06F 8/62* (2013.01); *G06F 9/445* (2013.01); *G06F 9/45558* (2013.01); *G06F 21/57* (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 7,805,722 B2 | 9/2010 | Mori et al. | |
| 8,185,891 B2 | 5/2012 | Dehaan | |
| 8,352,937 B2* | 1/2013 | Sanders | .............. G06F 9/45537 717/174 |
| 8,566,391 B2* | 10/2013 | Saito | ..................... G06F 21/105 709/203 |
| 8,973,090 B1* | 3/2015 | Banerjee | ................. G06F 21/51 726/1 |
| 9,594,581 B2* | 3/2017 | Huber | ...................... G06F 8/61 |

(Continued)

OTHER PUBLICATIONS

Tian et al., "A Novel Software Deployment Method Based on Installation Packages," Proceedings of the Fifth Annual ChinaGrid Conference, Jul. 2010, pp. 228-233. (Abstract only).

(Continued)

*Primary Examiner* — Lewis A Bullock, Jr.
*Assistant Examiner* — Bruce S Ashley
(74) *Attorney, Agent, or Firm* — Yee & Associates, P.C.; Richard Wilhelm (57) ABSTRACT

A software installation method comprising receiving an instruction to install a first software entity in a first computing environment, establishing a virtual computing environment in the first computing environment, and installing the software entity in the virtual computing environment, wherein the establishing and the installing are subject to a determination that a user is not privileged to install the first software entity in the first computing environment.

18 Claims, 2 Drawing Sheets

(56) References Cited

U.S. PATENT DOCUMENTS

| | | | |
|---|---|---|---|
| 2006/0021029 A1* | 1/2006 | Brickell | G06F 21/51 726/22 |
| 2007/0174840 A1* | 7/2007 | Sharma | G06F 11/34 718/104 |
| 2007/0174915 A1* | 7/2007 | Gribble | G06F 21/53 726/24 |
| 2008/0301672 A1 | 12/2008 | Rao et al. | |
| 2009/0125902 A1* | 5/2009 | Ghosh | G06F 9/45533 718/1 |
| 2009/0313620 A1* | 12/2009 | Sedukhin et al. | 718/1 |
| 2010/0077475 A1* | 3/2010 | Deschenes | G06F 8/61 726/21 |
| 2010/0262962 A1* | 10/2010 | Chaganti | 717/174 |
| 2012/0240221 A1* | 9/2012 | Perlman et al. | 726/17 |
| 2013/0047149 A1* | 2/2013 | Xu | G06F 8/61 717/175 |
| 2013/0132691 A1* | 5/2013 | Banga | G06F 21/53 711/162 |
| 2013/0232481 A1* | 9/2013 | Yamashita | G06F 9/445 717/177 |

OTHER PUBLICATIONS

"Zero Install Injector—Install software easily and without root privileges," Ubuntu Geek, Mar. 12, 2010, 15 pages. http://www.ubuntugeek.com/zero-install-injector-install-software-easily-and-without-root-privileges.html.

* cited by examiner

SOFTWARE INSTALLER WITH BUILT-IN HYPERVISOR

This application claims the benefit of priority to United Kingdom Patent Application Serial No. GB1222633.8, filed on Dec. 14, 2012, the contents of which are hereby incorporated by reference.

BACKGROUND

The present disclosure is an invention disclosure relating to a software installation method, a software installation system as well as a corresponding computer program product.

Software installation is well-known task that must be carried out frequently. For example, software installation may be necessary to ensure that software is kept up-to-date, e.g. to improve compatibility with other software and/or patch security vulnerabilities. Similarly, software installation may be necessary to expand the software available to a user, e.g. for testing or to provide additional functionality.

The present disclosure expounds upon this background.

BRIEF SUMMARY

Loosely speaking, the present disclosure teaches a software installation method that allows a user to install software, e.g. for testing purposes, even if the user does not have the (initially) necessary privileges and/or if the computing environment where the software is to be installed does not (initially) fulfill all the hardware/software requirements necessary for installation/operation of the software. This is achieved by establishing a virtual computing environment within the computing environment where the software is to be installed. At least those components of the software having installation requirements that cannot be fulfilled by the user and/or by the intended computing environment can then be installed in the virtual computing environment. In this respect, the user may be given further privileges in the virtual computing environment and/or the virtual computing environment may emulate hardware/software not present in the intended computing environment. If the user is pleased with the software, they can later have the software "properly" installed by an administrator with sufficient privileges and/or they can "properly" reinstall the software once having installed the hardware/software necessary for "proper" installation. The virtual computing environment can then be deleted. As such, the present disclosure teaches a software installation method that allows software to be installed without delay, e.g. for testing purposes that might not justify the purchase of additional hardware/software and/or the involvement of an administrator.

In one aspect, as touched upon supra, the present disclosure relates to a software installation method.

The method may comprise receiving an instruction to install a (first) software entity, e.g. an instruction to install the (first) software entity in a (first) computing environment.

The software entity may be a software application, i.e. a quantity of code capable of (self-contained) execution on a computer, e.g. that can be executed without requiring code other than that provided by a (host) operating system. Similarly, the software entity may be a collection of data, e.g. a database required for proper operation of a software application.

The (first) computing environment may be a virtual computing environment, a non-virtual computing environment or a mixture of virtual and non-virtual computing environments. The (first) computing environment may be configured to be accessible only to a single user, e.g. may be a user account (in an operating system executing) on a personal computer or a user account in a computer network, and may be understood as including one or more (virtual) storage devices, e.g. storage devices attached directly to such a laptop computer, personal computer, etc. The (first) computing environment may be a user account in a virtual computing environment, e.g. on a so-called "virtual machine." Similarly, the (first) computing environment may be a user account executing on a server remote from a user input/output terminal (e.g. a display terminal). In the present disclosure, the term "virtual computing environment" may be understood as software that emulates a computing environment. The virtual computing environment may emulate software, e.g. an operating system. Similarly, the virtual computing environment may emulate computer hardware such as a microprocessor, one or more input and/or output interfaces (e.g. a USB interface, a FireWire interface, an Ethernet interface, etc.), one or more input and/or output devices (e.g. a mouse, a trackpad, a sound card, etc.), one or more storage devices, etc. In the present disclosure, the term "non-virtual computing environment" may be understood as a computing environment that is not emulated. For example, the non-virtual computing environment may comprise (computer) hardware, e.g. as described above. Similarly, the non-virtual computing environment may comprise an operating system, e.g. an operating system executing (natively) on computer hardware, i.e. an operating system that hosts (directly or indirectly) all other software executing on that computer hardware. As such, the non-virtual computing environment may be, for example, an operating system executing (natively) on a laptop computer, a personal computer or other single end-user computing device.

The instruction may be received from a user, e.g. a user of the (first) computing environment. The instruction may be received via a user input device such as a mouse, trackpad and/or keyboard, e.g. via a user input device belonging to the (first) computing environment. The instruction may identify the (first) software entity by a name and/or location of the (first) software entity and/or by other data that (uniquely) identifies the (first) software entity. Similarly, the instruction may identify an installer (package), e.g. an installer (package) comprising the (first) software entity.

The method may comprise establishing a virtual computing environment.

The establishing of the virtual computing environment may be effected (at least in part) by an installer (package), e.g. an installer (package) comprising the (first) software entity. Similarly, the establishing of the virtual computing environment may be instigated by an installer (package). As such, the method may comprise storing data representative of the installer (package) on a storage device of the (first) computing environment. The data may be obtained from a storage medium and/or downloaded (from a remote storage device) via a network. The storing/obtaining/downloading may be instigated by (an operating system of) the (first) computing environment, e.g. in response to (receipt of) the instruction to install the (first) software entity. Similarly, the method may comprise instigating execution of the installer (package). Execution may be instigated by (an operating system of) the (first) computing environment, e.g. in response to (receipt of) the instruction to install the (first) software entity. The establishing of a virtual computing environment may comprise installing (one or more components of an) emulation that provides the virtual computing environment. The virtual computing environment may be established such that the user has root/administrator privileges in the (established) virtual computing environment. For example, the user may be privileged to start, stop and/or restart the (established) virtual computing environment. The virtual computing environment may be established in the (first) computing environment. As such, the (emulation) software that provides the virtual computing environment may be installed in the (first) computing environment, e.g. on (computer) hardware constituting (part of) the (first) computing environment. The installing may comprise storing data representative of the (emulation) software on a storage device of the (first) computing environment. The data may be obtained from a storage medium and/or downloaded (from a remote storage device) via a network. The (emulation) software may be a component of the installer (package). In other words, the installer (package) may comprise the (emulation) software. The (emulation) software may be configured to emulate any (one or more or all) hardware/software (components) necessary for installation and/or execution of the (first) software entity (An elucidation of the term "any" is given in the closing paragraphs of this specification). Similarly, the establishing of a virtual computing environment may comprise installing/instigating installation and/or executing/instigating execution of such (emulation) software. Installation/execution may be instigated by issuing a corresponding instruction to the (first) computing environment. As touched upon above, installation/execution of the (emulation) software may be instigated by an installer (package).

As touched upon above, the (emulation) software may comprise a plurality of components. For example, the (emulation) software may comprise a hypervisor (also known as a "virtual machine manager"). Examples of commercially available hypervisors are VMWare, Parallels, QEMU, Virtual PC and VirtualBox. The hypervisor may emulate (computer) hardware. For example, the hypervisor may emulate one or more resources (e.g. a processor, a memory, an I/O interface, a storage device) of the hardware/computer on which the hypervisor is executing. Similarly, the hypervisor may emulate one or more resources (e.g. a processor, a memory, an I/O interface, a storage device) of hardware that differs from the hardware (of the computer) on which the hypervisor is executing. Similarly, the (emulation) software may comprise one or more operating systems, e.g. a ("bare bones") operating system that executes on (computer) hardware emulated by the hypervisor. In this respect, the hypervisor may emulate an instance of (computer) hardware for each operating system hosted by the hypervisor, i.e. executing on (computer) hardware emulated by the hypervisor. Such a combination of emulated (computer) hardware and an operating system is commonly termed a "virtual machine." An example of a "virtual machine" is a Unix operating system running on an emulated PC. The software emulating the PC may be executing in a Windows operating system environment running on a non-virtual, i.e. physically existing, PC. As such, the virtual computing environment may be a "virtual machine." The hypervisor may manage such virtual machines. For example, the hypervisor may instigate the launch/interruption/termination of one or more operating systems executing on the (computer) hardware emulated by the hypervisor, e.g. in response to a user input or in response to a command from the installer (package). Similarly, the hypervisor may instigate the installation/removal of software from (emulated storage devices of) the (computer) hardware emulated by the hypervisor. As such, the establishing of the virtual computing environment may be effected, at least in part, by the hypervisor. For example, the hypervisor may instigate the installation/removal of an operating system and/or the (first) software entity from (emulated storage devices of) the (computer) hardware emulated by the hypervisor. The hypervisor may comprise data representative of the operating system. Similarly, the hypervisor may obtain such data from a storage medium and/or download such data (from a remote storage device) via a network. Furthermore, such data may be a component of the installer (package). In other words, the installer (package) may comprise such data. The hypervisor may have administrator/root privileges in the operating system (executing on the (computer) hardware emulated by the hypervisor). The hypervisor may be a component of the installer (package). In other words, the installer (package) may comprise the hypervisor. Nonetheless, the hypervisor may be capable of operation independent of one or more or all other components of the installer (package). For example, the hypervisor may execute/continue execution while any other components of the installer (package) are not executing.

As touched upon above, the establishing of the virtual computing environment may comprise executing an installer (package) that instigates installation and execution of a hypervisor in the (first) computing environment, which hypervisor emulates (computer) hardware and installs an operating system on the emulated (computer) hardware. Similarly, the establishing of the virtual computing environment may comprise executing an installer (package) that instigates a hypervisor (already executing) in the (first) computing environment (to create/emulate another instance of emulated (computer) hardware and) to install an operating system on (computer) hardware emulated by the hypervisor. As such, the establishing of the virtual computing environment need not comprise installation of a hypervisor, e.g. in cases where a hypervisor is already available in the (first) computing environment.

The method may comprise installing the (first) software entity in the (established) virtual computing environment. The installing may comprise storing data representative of the (first) software entity on a storage device of the (established) virtual computing environment. The data may be obtained from a storage medium and/or downloaded via a network. The installing may be effected by an installer (package), e.g. an installer (package) comprising the (first) software entity. Similarly, the installing may be effected by a hypervisor, e.g. as described above.

The establishing of the virtual computing environment may be subject to a (first) condition. In other words, the method may be such that the establishing is effected if and only if the (first) condition is fulfilled. Similarly, the installing of the (first) software entity in the (established) virtual computing environment may be subject to a (second) condition. In other words, the method may be such that the installing is effected if and only if the (second) condition is fulfilled. The first and second conditions may be identical. For example, either or both of the first and second conditions may be a determination that a user is not privileged to install the (first) software entity. Similarly, either or both of the first and second conditions may be a determination that a user is not privileged to install the (first) software entity in the (first) computing environment.

The method may comprise determining whether a user is privileged to install the (first) software entity. For example, the method may comprise determining whether a user is privileged to install the (first) first software entity in the (first) computing environment. The aforementioned determination may be a result of the determining. The determining may be carried out by an installer (package), e.g. in response to (receipt of) the instruction to install the (first) software entity.

The determining may comprise attempting to install the (first) software entity (in the (first) computing environment) and monitoring whether an error (e.g. a "permission denied" error) is returned, e.g. by an operating system.

Similarly, the determining may comprise receiving a user input, e.g. in response to an inquiry whether the user possesses root/administrator privileges (for the (first) computing environment). As such, the method may comprise presenting such an inquiry to the user. The determining may moreover comprise determining whether data indicative of requirements necessary for installation of the (first) software entity indicates that root/administrator privileges are required for installation of the (first) software entity. Such data may be comprised by an installer (package), e.g. an installer (package) comprising the (first) software entity. Similarly, an installer (package) may obtain such data from a storage medium and/or by download (from a remote storage device) via a network.

The method may comprise determining whether the (first) computing environment fulfills (a set of one, at least two or all) prerequisites for execution of the (first) software entity. As such, the method may comprise storing/obtaining data indicative of prerequisites for execution of the (first) software entity. Such data may be comprised by an installer (package), e.g. an installer (package) comprising the (first) software entity. Similarly, an installer (package) may obtain such data from a storage medium and/or by download (from a remote storage device) via a network. The prerequisites may comprise one or more software prerequisites and/or one or more hardware prerequisites. For example, execution of the (first) software entity may require that the (host/first) computing environment comprises/has access to one or more software entities such as a database, a license key, driver software, etc. Similarly, execution of the (first) software entity may require that the (host/first) computing environment comprises/has access to hardware (i.e. one or more hardware entities) such as a (given) microprocessor, a mouse, a graphics tablet, a sound card, etc. The determining may comprise receiving information, e.g. from the (host/first) computing environment, indicative of one or more software/hardware entities comprised by/accessible to the (host/first) computing environment. The information may be received in response to a query, e.g. a query from an installer (package). The query may specify any of the (software/hardware) prerequisites indicated by the (aforementioned) data. The determining may comprise comparing the received information with respective prerequisites indicated by the data. The determining may be carried out by an installer (package), e.g. in response to (receipt of) the instruction to install the (first) software entity. The determining may yield a determination whether the (first) computing environment fulfills (the set of one, at least two or all) prerequisites for execution of the (first) software entity. Similarly, the determining may yield a list of prerequisites (for execution of the (first) software entity) not fulfilled by the (first) computing environment.

The establishing of the virtual computing environment may be subject to a (third) condition. In other words, the method may be such that the establishing is effected if and only if the (third) condition is fulfilled. Similarly, the installing of the (first) software entity in the (established) virtual computing environment may be subject to a (fourth) condition. In other words, the method may be such that the installing is effected if and only if the (fourth) condition is fulfilled. The third and fourth conditions may be identical. For example, either or both of the third and fourth conditions may be a determination that the (first) computing environment fulfills (the set of one, at least two or all) prerequisites for execution of the (first) software entity.

As such, the establishing of the virtual computing environment may be subject to the first and third conditions. In other words, the method may be such that the establishing of the virtual computing environment occurs if and only if both the first condition and the third condition are fulfilled. Similarly, the installing of the (first) software entity in the (established) virtual computing environment may be subject to the second and fourth conditions. In other words, the method may be such that the installing of the (first) software entity in the (established) virtual computing environment occurs if and only if both the second condition and the fourth condition are fulfilled.

The (established) virtual computing environment may comprise a plurality of components, each component emulating respective software and/or computer hardware. The establishing of the virtual computing environment may comprise installing (emulation) software that provides a selected (sub)set of the plurality of components. The (sub) set may be selected using the list of prerequisites not fulfilled by the (first) computing environment. The establishing of the virtual computing environment may comprise installing no more (emulation) software than necessary to emulate the prerequisites not fulfilled by the (first) computing environment.

The method may comprise receiving an instruction to uninstall the (first) software entity, e.g. an instruction to uninstall the (first) software entity from the (first) computing environment. The instruction may be received from a user, e.g. a user of the (first) computing environment. The instruction may be received via a user input device such as a mouse, trackpad and/or keyboard, e.g. via a user input device belonging to the (first) computing environment. The instruction may identify the (first) software entity by a name and/or location of the (first) software entity and/or by other data that (uniquely) identifies the (first) software entity. Similarly, the instruction may identify an (un)installer (package), e.g. an installer (package) comprising the (first) software entity and an uninstall component for uninstalling the (first) software entity.

The method may comprise removing the (established) virtual computing environment, e.g. from the (first) computing environment. The removing of the (established) virtual computing environment may be effected by an (un) installer (package), e.g. an installer (package) comprising the (first) software entity and an uninstall component for uninstalling the (first) software entity. As such, any of the establishing, installing and removing may be effected by a (single/common) installer (package). The method may comprise storing data representative of the (un)installer (package) on a storage device of the (first) computing environment. The data may be obtained from a storage medium and/or downloaded (from a remote storage device) via a network. The storing/obtaining/downloading may be instigated by (an operating system of) the (first) computing environment, e.g. in response to (receipt of) the instruction to (un)install the (first) software entity. Similarly, the method may comprise instigating execution of the (un)installer (package). Execution may be instigated by (an operating system of) the (first) computing environment, e.g. in response to (receipt of) the instruction to uninstall the (first) software entity.

The removing of the (established) virtual computing environment may comprise uninstalling/deleting (emulation) software that provides the (established) virtual computing environment, e.g. uninstalling/deleting the (emulation) software from the (first) computing environment. The uninstalling/deleting may comprise removing a reference to the (emulation) software from a registry. The uninstalling/deleting may comprise designating a memory location where the (emulation) software is stored as free memory.

The method may comprise receiving an instruction to install a software package, e.g. an instruction to install a (first) software package in the (first) computing environment. The (first) software package may comprise a plurality of software entities. For example, the (first) software package may comprise the first software entity and another (second) software entity. The instruction to install the software package may (implicitly) comprise the instruction to install the first software entity and/or an instruction to install the other/second software entity, e.g. in the (first) computing environment. The instruction may be received from a user, e.g. a user of the (first) computing environment. The instruction may be received via a user input device such as a mouse, trackpad and/or keyboard, e.g. via a user input device belonging to the (first) computing environment. The instruction may identify the (first) software package by a name and/or location of the (first) software package and/or by other data that (uniquely) identifies the (first) software package. The (first) software package may be an installer (package), e.g. an installer (package) comprising the first software entity and the other/second software entity.

The method may comprise installing the other/second software entity in the (first) computing environment. The installing may comprise storing data representative of the other/second software entity on a storage device of the (first) computing environment. The data may be obtained from a storage medium and/or downloaded via a network. The installing may be effected by an installer (package), e.g. an installer (package) comprising the first software entity and/or the other/second software entity. Similarly, the installing may be effected by a hypervisor, e.g. as described above.

In a manner analogous the descriptions above, the method may comprise receiving additional (implicit) instructions from a user to install one or more software entities in the (first) computing environment. The method may comprise installing the respective software entities in either the (first) computing environment or the (established) virtual computing environment depending on whether the user is privileged to install the respective software entity in the (first) computing environment and/or whether the (first) computing environment fulfills (a set of one or more or all) prerequisites for execution of the respective software entity.

While the teachings of the present disclosure have been discussed hereinabove mainly in the form of a method, the teachings may be embodied, mutatis mutandis, in the form of a system, e.g. a software installation system, or a computer program product, as will be appreciated by the person skilled in the art.

The system may be configured and adapted to effect any of the actions described above with respect to the disclosed method. For example, the system may comprise a controller that effects any of the actions described above with respect to the disclosed method.

The system may comprise a (first) instruction receiver that receives an instruction to install a (first) software entity, e.g. as described above.

The system may comprise a virtual computing environment establisher that establishes a virtual computing environment, e.g. as described above.

The system may comprise a software entity installer that installs a software entity in a virtual computing environment, e.g. as described above.

The system may comprise a privilege determiner that determines whether a user is privileged to install a software entity in a (first) computing environment, e.g. as described above.

The system may comprise a prerequisite fulfillment determiner that determines whether a (first) computing environment fulfills prerequisites for execution of a (first) software entity, e.g. as described above.

The system may comprise a hypervisor, e.g. as described above.

The system may comprise a (second) instruction receiver that receives an instruction to uninstall a (first) software entity, e.g. as described above.

The system may comprise a software entity remover that removes a virtual computing environment, e.g. as described above.

The system may comprise a user input device that receives user inputs as discussed hereinabove.

Any of the aforementioned elements of the system may communicate with any other of the aforementioned elements of the system. In this respect, the system may comprise one or more communication busses/links interconnecting the respective elements.

DETAILED DESCRIPTION

Figure 1:
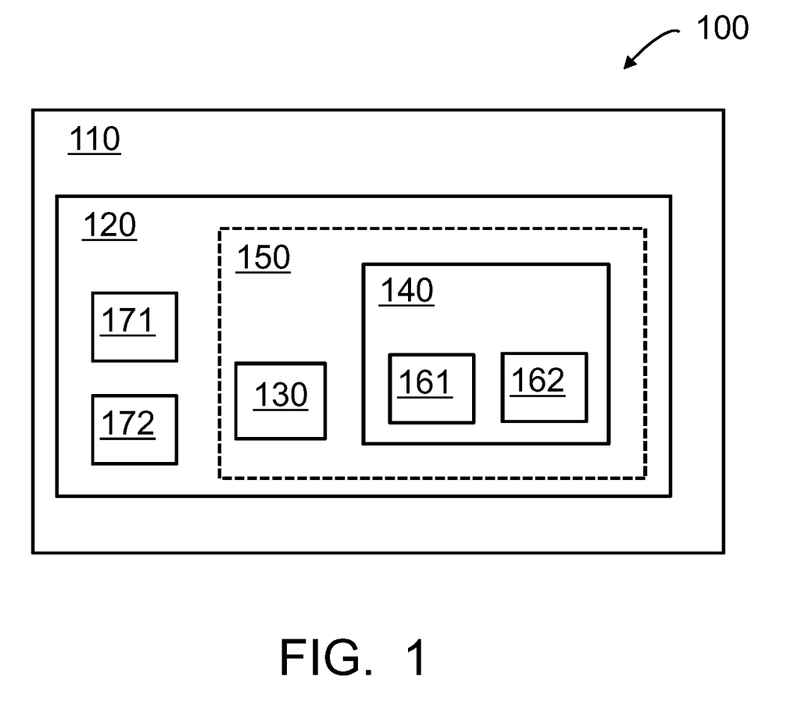
FIG. 1 schematically shows a computing environment using a software installation system in accordance with the present disclosure.

FIG. 1 schematically shows a computing environment 100 using a software installation system in accordance with the present disclosure, e.g. as described above.

In the illustrated embodiment, computing environment 100 comprises computer hardware 110 that hosts an operating system 120 as another computing environment. In response to receiving a user instruction to install a plurality of software entities 161, 162, 171, 172 in in the computing environment constituted by operating system 120, operating system 120 instigates download and execution of an installer package comprising data representative of the plurality of software entities 161, 162, 171, 172 and a hypervisor 130. The installer package determines whether operating system 120 fulfills prerequisites for executing the plurality of software entities 161, 162, 171, 172. In response to a determination that operating system 120 fulfills prerequisites for executing software entities 171 and 172, but does not fulfill prerequisites for executing software entities 161 and 162, the installer package instigates installation and execution of hypervisor 130. Hypervisor 130 emulates computer hardware and installs an operating system 140 on the emulated computer hardware. Together, hypervisor 130 and operating system 140 constitute a virtual computing environment 150. The installer package installs software entities 161 and 162 in virtual computing environment 150 and installs software entities 171 and 172 in the computing environment constituted by operating system 120.

Figure 2:
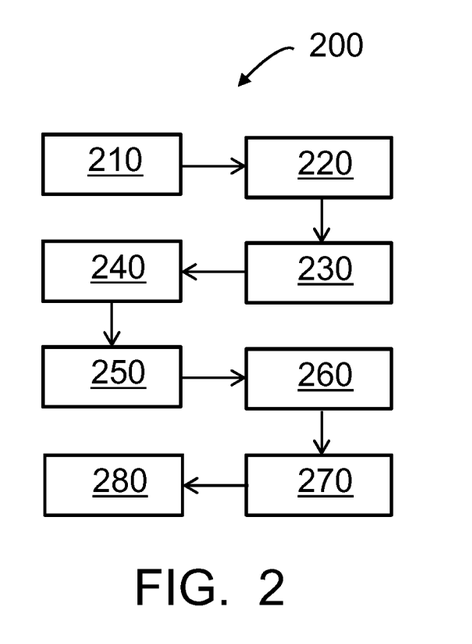
FIG. 2 schematically shows a flow diagram of an embodiment of a software installation method in accordance with the present disclosure.

FIG. 2 schematically shows a flow diagram 200 of an embodiment of a software installation method 200 in accordance with the present disclosure, e.g. as described above.

In the illustrated embodiment, flow diagram 200 comprises a step 210 of receiving an instruction to install a first software entity, a step 220 of establishing a virtual computing environment, a step 230 of installing the software entity in the virtual computing environment, an optional step 240 of determining whether a user is privileged to install the first software entity in a first computing environment, an optional step 250 of determining whether the first computing environment fulfills prerequisites for execution of the first software entity, an optional step 260 of receiving an instruction to uninstall the first software entity, an optional step 270 of removing the virtual computing environment and an optional step 280 of installing a second software entity in the first computing environment.

Figure 3:
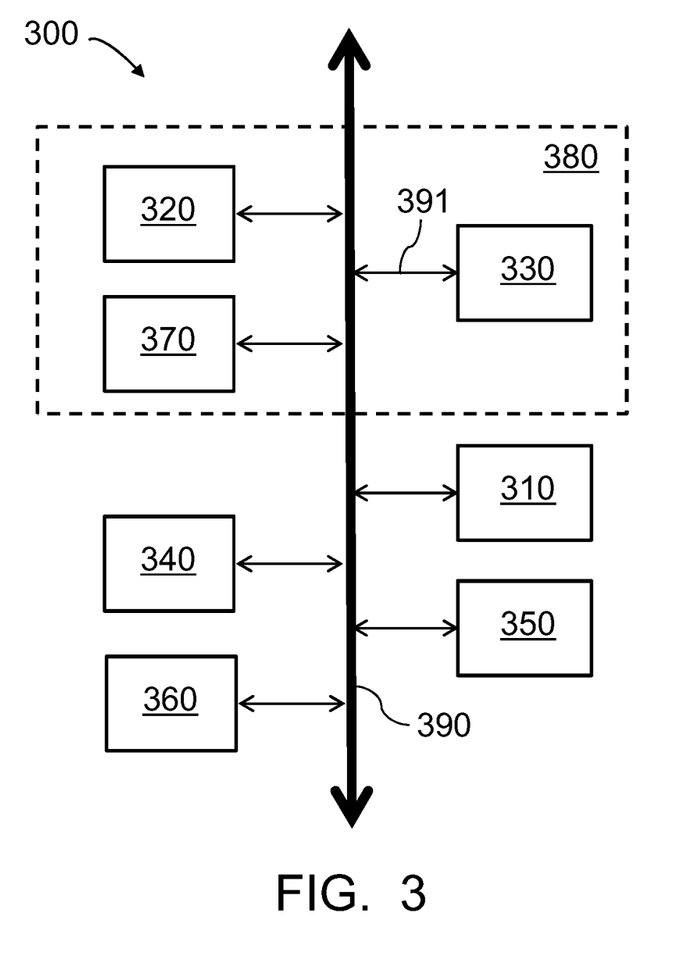
FIG. 3 schematically shows an embodiment of a software installation system in accordance with the present disclosure.

FIG. 3 schematically shows an embodiment of a software installation system 300 in accordance with the present disclosure, e.g. as described above.

In the illustrated embodiment, software installation system 300 comprises a first instruction receiver 310 that receives an instruction to install a first software entity, in virtual computing environment establisher 320 that establishes a virtual computing environment, a software entity installer 330 that installs the first software entity in the virtual computing environment, an optional privilege determiner 340 that determines whether a user is privileged to install the first software entity in a first computing environment, an optional prerequisite fulfillment determiner 350 that determines whether the first computing environment fulfills prerequisites for execution of the first software entity, an optional second instruction receiver 360 that receives an instruction to uninstall the first software entity, a virtual computing environment remover 370 that removes the virtual computing environment from the first computing environment, an optional hypervisor 380 and an optional communication bus 390 comprising a plurality of communication links 391 (for the sake of legibility, only one communication bus and only one communication links bears a reference sign). Communication bus 390 and the communication links 391 communicatively interconnect the aforementioned elements of software installation system 300. In the illustrated embodiment, hypervisor 380 comprises virtual computing environment establisher 320, software entity installer 330 and virtual computing environment remover 370.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the present disclosure, the verb "may" is used to designate optionality/non-compulsoriness. In other words, something that "may" can, but need not.

In the present disclosure, the term "any" may be understood as designating any number of the respective elements, i.e. as designating one, at least one, at least two, each or all of the respective elements. Similarly, the term "any" may be understood as designating any collection(s) of the respective elements, i.e. as designating one or more collections of the respective elements, a collection comprising one, at least one, at least two, each or all of the respective elements. The respective collections need not comprise the same number of elements.

In the present disclosure, the term "receiving" may comprise receiving/obtaining the respective element/information from a storage medium, via a computer network and/or by user input. In the present disclosure, any "receiving" may be accompanied by a "storing" of the received element/information, e.g. in a computer memory, on a hard disk, in a flash storage device or in any other storage device. In other words, where the method comprises a receiving of an element/information, the method may comprise a storing of the received element/information.

In the present disclosure, expressions in parentheses may be understood as being optional. As used in the present disclosure, quotation marks may emphasize that the expression in quotation marks may also be understood in a figurative sense. As used in the present disclosure, quotation marks may identify a particular expression under discussion.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A software installation method comprising:
receiving an instruction to install a software package in a first computing environment, the software package comprising a first software entity, a second software entity, and a hypervisor;
responsive to receiving the instruction to install the software package in the first computing environment, performing the steps of: acquiring prerequisites for the software entities from a database; and determining, for all software entities of the software package, whether a user is privileged to install the respective entity in the first computing environment and whether the first computing environment fulfills acquired prerequisites for the entity;
subject to determining that the user is not privileged to install the first software entity in the first computing environment or the first computing environment does not fulfill the prerequisites for the entity, performing the steps of: installing the hypervisor from the software package in the first computing environment; and establishing, by the hypervisor, a virtual computing environment in the first computing environment;
subject to determining that the user is privileged to install the second software entity in the first computing environment, designating the second software entity for installation in a non-virtual computing environment of the first computing environment; and
installing the first software entity in the created virtual computing environment while installing the second software entity in the designated non-virtual computing environment.

2. The method of claim 1, wherein the non-virtual computing environment comprises an operating system natively executing on computer hardware of the first computing environment.

3. The method of claim 1, wherein determining the first computing environment fulfills acquired prerequisites further comprising:
determining whether the first computing environment fulfills all hardware and software prerequisites for execution of the second software entity, wherein the installing of the second software entity is also performed subject to a determination that the first computing environment fulfills all the hardware and software prerequisites for execution of the second software entity.

4. The method of claim 1, further comprising:
receiving an instruction to uninstall the first software entity; and
removing the virtual computing environment from the first computing environment in response to receiving the instruction to uninstall the first software entity.

5. The method of claim 1, wherein the virtual computing environment comprises hardware emulated by a hypervisor and an operating system that executes on the emulated hardware.

6. The method of claim 1, wherein the user has administrative privileges in the established virtual computing environment that are required to install the first software entity in the established virtual computing environment.

7. The method of claim 6, wherein the administrative privileges are provided when establishing the virtual computing environment.

8. The method of claim 1, wherein determining the first computing environment fulfills acquired prerequisites further comprising:
determining whether the first computing environment fulfills all prerequisite resources for execution of the second software entity; and
responsive to determining that the first computing environment does not fulfill all prerequisite resources for execution of the second software entity, emulating non-fulfilled prerequisite resources in the virtual computing environment that are not present in the first computing environment.

9. A software installation system, comprising:
a processor and a memory device;
a first instruction receiver configured to receive an instruction to install a software package in a first computing environment, the software package comprising a first software entity, a second software entity, and a hypervisor;
a privilege determiner configured to, responsive to receiving the instruction to install the first software entity in the first computing environment, performing the steps of: acquiring prerequisites for the software entities from a database; determining for all software entities of the software package whether a user is privileged to install the respective entity in the first computing environment and whether the first computing environment fulfills acquired prerequisites for the entity;
a virtual computing environment establisher configured to, subject to determining that the user is not privileged to install the first software entity in the first computing environment, or the first computing environment does not fulfill the prerequisites for the entity, performing the steps of: installing the hypervisor from the software package in the first computing environment; and establishing by the hypervisor, a virtual computing environment in the first computing environment;
the virtual computing environment establisher configured to subject to determining that the user is privileged to install the second software entity in the first computing environment, designating the second software entity for installation in a non-virtual computing environment of the first computing environment; and
a software entity installer configured to install the first software entity in the created virtual computing environment while installing the second software entity in the designated non-virtual computing environment.

10. The system of claim 9, wherein the non-virtual computing environment comprises an operating system configured to natively execute on computer hardware of the first computing environment.

11. The system of claim 9, further comprising:
a prerequisite fulfillment determiner configured to determine whether the first computing environment fulfills all hardware and software prerequisites for execution of the second software entity, wherein the installing of the second software entity is also performed subject to a determination that the first computing environment fulfills all the hardware and software prerequisites for execution of the second software entity.

12. The system of claim 9, further comprising:
a second instruction receiver configured to receive an instruction to uninstall the first software entity; and
a virtual computing environment remover configured to remove the virtual computing environment from the first computing environment in response to receiving the instruction to uninstall the first software entity.

13. The system of claim 9, wherein the virtual computing environment comprises hardware emulated by a hypervisor and an operating system configured to execute on the emulated hardware.

14. The system of claim 9, wherein the user has administrative privileges in the established virtual computing environment that are required to install the first software entity in the established virtual computing environment.

15. A computer program product comprising computer readable program code stored on a non-transitory computer usable storage medium that is operable for causing a computer to perform a method, when the computer readable program code is run on the computer, comprising steps of:
receiving an instruction to install a software package in a first computing environment, the software package comprising a first software entity, a second software entity, and a hypervisor;
responsive to receiving the instruction to install the software package in the first computing environment, performing the steps of: acquiring prerequisites for the software entities from a database; and determining, for all software entities of the software package, whether a user is privileged to install the respective entity in the first computing environment and whether the first computing environment fulfills acquired prerequisites for the entity;
subject to determining that the user is not privileged to install the first software entity in the first computing environment or the first computing environment does not fulfill the prerequisites for the entity, performing the steps of: installing the hypervisor from the software package in the first computing environment; and establishing, by the hypervisor, a virtual computing environment in the first computing environment;
subject to determining that the user is privileged to install the second software entity in the first computing environment, designating the second software entity for installation in a non-virtual computing environment of the first computing environment; and
installing the first software entity in the created virtual computing environment while installing the second software entity in the designated non-virtual computing environment.

16. The computer program product of claim 15, wherein the non-virtual computing environment comprises an operating system configured to natively execute on computer hardware of the first computing environment.

17. The computer program product of claim 15, wherein determining the first computing environment fulfills acquired prerequisites further comprising:

determining whether the first computing environment fulfills all hardware and software prerequisites for execution of the second software entity, wherein the installing of the second software entity is also performed subject to a determination that the first computing environment fulfills all the hardware and software prerequisites for execution of the second software entity.

18. The computer program product of claim 15, wherein the user has administrative privileges in the established virtual computing environment that are required to install the first software entity in the established virtual computing environment.

\* \* \* \* \*